United States Patent
Ito et al.

(10) Patent No.: US 6,782,344 B2
(45) Date of Patent: Aug. 24, 2004

(54) METHOD AND APPARATUS FOR DIAGNOSING ABNORMALITY AND ESTIMATING DEGRADATION IN VALVE APPARATUS

(75) Inventors: Haruo Ito, Tokyo (JP); Susumu Watanabe, Hiratsuka (JP); Tomoaki Sumita, Ayase (JP)

(73) Assignee: Japan Atomic Power Co., Tokyo (JP)

( * ) Notice: Subject to any disclaimer, the term of this patent is extended or adjusted under 35 U.S.C. 154(b) by 111 days.

(21) Appl. No.: 10/034,168

(22) Filed: Dec. 28, 2001

(65) Prior Publication Data

US 2002/0095986 A1 Jul. 25, 2002

(51) Int. Cl.⁷ .................................................. G06F 9/00
(52) U.S. Cl. ........................ 702/182; 702/98; 702/100; 702/183
(58) Field of Search .............................. 702/34, 41, 54, 702/56, 69, 100, 102, 138, 146, 151, 189, 182, 45, 50, 60, 98, 183; 73/168; 175/45; 62/74; 700/286–287

(56) References Cited

U.S. PATENT DOCUMENTS

| | | | | |
|---|---|---|---|---|
| 5,924,975 A | * | 7/1999 | Goldowsky | 600/16 |
| 6,330,525 B1 | * | 12/2001 | Hays et al. | 702/183 |
| 6,490,506 B1 | * | 12/2002 | March | 700/286 |
| 6,546,785 B1 | * | 4/2003 | Discenzo | 73/53.05 |

FOREIGN PATENT DOCUMENTS

| | | |
|---|---|---|
| JP | 6-94160 | 4/1994 |
| JP | 7-280705 | 10/1995 |

* cited by examiner

*Primary Examiner*—Marc S. Hoff
*Assistant Examiner*—Felix Suarez
(74) *Attorney, Agent, or Firm*—David A. Farah, M.D.; Sheldon & Mak PC (57) ABSTRACT

A sign of abnormality of a valve apparatus during its operation is grasped, an abnormal position and a portion requiring repair are specified, a range of inspection of an electric valve is limited and the degree of the sign of abnormality is judged without touching at all the valve apparatus. A driving force sensor provided to a driving portion of a valve apparatus is connected to a diagnosing apparatus, an energy sensor for detecting feed energy to the driving portion and a vibration sensor for detecting vibration of the valve apparatus are provisionally fitted to the valve apparatus. A data conversion unit converts the detection signals outputted from these three kinds of sensors to predetermined signals. An analytical diagnosing processing of diagnostic data information for each diagnostic item is conducted by referring to an allowance value of each diagnostic item and to a maintenance record inclusive of the diagnostic result to judge whether the valve apparatus is normal or abnormal to further conduct degradation estimation.

4 Claims, 6 Drawing Sheets

EXAMPLES OF DIAGNOSTIC RESULT

| DIAGNOSTIC ITEM | | JUDGMENT | |
|---|---|---|---|
| | | OPENING | CLOSING |
| MOTOR TORQUE | SEAT TORQUE | APPROVED | APPROVED |
| MOTOR LOAD, OPERATION | | APPROVED | APPROVED |
| OPERATION TORQUE | OPERATION TORQUE | APPROVED | APPROVED |
| | EXCESSIVE OPERATION TORQUE | APPROVED | APPROVED |
| OPERATION TORQUE, OPERATION THRUST | | APPROVED | APPROVED |
| OPERATION THRUST | OPERATION THRUST | APPROVED | APPROVED |
| | EXCESSIVE OPERATION THRUST | APPROVED | APPROVED |
| CHANGE OF TRANSMISSION SYSTEM WITH TIME | | APPROVED | |
| WEAR CONDITION OF STEM AND STEM NUT | | APPROVED | |
| WEAR AMOUNTS OF STEM AND STEM NUT AND LOOSENING OF LOCKING NUT | | REJECTED | |
| REVERSING CONTROLLER DELAY TIME | | APPROVED | REJECTED |
| OPENING/CLOSING TIME | | APPROVED | APPROVED |
| MOTOR BRAKE | | APPROVED | APPROVED |
| VALVE STROKE | | APPROVED | APPROVED |
| LIMIT SWITCH OPERATION POINT | | APPROVED | APPROVED |
| A ROTOR SWITCH OPERATION POINT | | APPROVED | |
| B ROTOR SWITCH OPERATION POINT | | APPROVED | |
| TORQUE SWITCH OPERATION POINT | | APPROVED | APPROVED |
| TORQUE BYPASS SWITCH OPERATION POINT | | APPROVED | APPROVED |
| TORQUE SET SCALE | | APPROVED | APPROVED |
| TORQUE SEAT CURRENT | | APPROVED | APPROVED |
| SET TORQUE | | REJECTED | APPROVED |
| TORQUE DROP AFTER TORQUE SEAT | | APPROVED | APPROVED |
| VALVE ELEMENT EXTRACTION TORQUE | | APPROVED | – |
| VALVE ELEMENT EXTRACTION THRUST | | APPROVED | – |
| ABNORMAL VIBRATION | | APPROVED | APPROVED |

METHOD AND APPARATUS FOR DIAGNOSING ABNORMALITY AND ESTIMATING DEGRADATION IN VALVE APPARATUS

BACKGROUND OF THE INVENTION

1. Field of the Invention

This invention relates to an abnormality diagnosing method of a valve apparatus such as electric valves (inclusive of solenoid valves) that can make diagnosis rationally and within a short time even during an operation of a plant and can convert maintenance of the valve apparatus from time management maintenance to condition monitor maintenance, and that can also make degradation estimation of the valve apparatus by use of database including the result of this diagnosis, a valve specification and a maintenance history including a periodical inspection plan and diagnosis, and eventually prepares a maintenance plan.

2. Description of the Related Art

Abnormality diagnosis of electric valves (inclusive of solenoid valves) and other valve apparatuses has been carried out in the past by opening a cover, changing the apparatus and fitting sensors.

However, to check the valve to be inspected by changing the valve and provisionally fitting the sensors, a power source must be cut off to insure safety, and the diagnosis can be conducted only during the stop of the plant operation. In addition, provisional jigs for removing the cover and fitting the sensors must be installed at a site having a limited space, and the majority of the working time is consumed by the fitting/removing work of the sensors when the restoration work after the diagnosis is completed is taken into account, too.

If all the sensors associated with the valve to be inspected are permanently installed for the purpose of diagnosis, the individual valves need the sensors and the sensor cables must be permanently laid down, thus inviting the problems of cost and management.

An apparatus for diagnosing a plurality of electric valves on the basis of consumed power of a motor by measuring an electric current and a voltage of power lines and control lines at a motor control center where driving power sources are concentrated to be controlled on a predetermined place is known as an apparatus that diagnoses the valve apparatus without changing it.

In this case, however, since the output (torque) of a driving portion is not measured, a minute change of the torque cannot be detected, in principle, particularly in a low load range. Therefore, the drawback remains unsolved in that the wear amounts of transmission elements of a transmission system and incomplete fitting of components cannot be detected. Further, it is theoretically impossible to judge the magnitude of mechanical inertia force after the feed of voltage and current to the motor is stopped and to judge whether or not the torque held by the electric valve after the stop of the motor is sufficient for cutting off a fluid.

Further, a conversion coefficient, that becomes necessary for converting electric power to the output torque of the driving portion, changes every moment, cannot be therefore known correctly and has low accuracy.

On the other hand, a diagnosing apparatus that has a torque measuring function indispensable for high precision diagnosis of a valve apparatus without opening and decomposing at all a cover and is applicable during the operation of a plant has not yet been developed at present.

SUMMARY OF THE INVENTION

It is an object of the present invention to provide a method and an apparatus for the method, for diagnosing abnormality and estimating degradation in a valve apparatus that can grasp abnormality and specify an abnormal position in the valve apparatus as a whole by using a driving force sensor provided permanently to the valve apparatus and provisional sensors adaptable by one-tough operation during a plant operation or a periodical inspection without changing at all the valve apparatus, can collectively conduct stipulation of a portion to be repaired, can limit an inspection range of the valve apparatus and can judge an abnormal sign to decide a repair timing of components and a maintenance timing by conducting the tendency management on the basis of the built-up data, and can be moreover practiced without a high level of skill.

According to the present invention, there is provided a method for diagnosing abnormality and estimating degradation in a valve apparatus, comprising the steps of connecting a driving force sensor provided to a driving portion of a valve apparatus to a diagnosing apparatus, provisionally fitting an energy sensor for detecting feed energy to the driving portion and a vibration sensor for detecting vibration of the valve apparatus to the valve apparatus; converting detection signals outputted from these three kinds of sensors to predetermined signals in a data conversion unit; conducting an analytical diagnosing processing of diagnostic data information for each diagnostic item by referring to an allowance value of each diagnostic item calculated from the specification of the valve apparatus and set in advance, and by referring to a maintenance record inclusive of the diagnostic result, to judge whether the valve apparatus is normal or abnormal; conducting further degradation estimation by conducting calculation with past diagnostic results, and preparing a future maintenance plan, thereby making it possible to conduct diagnosis from outside without opening and disassembling the valve apparatus and without cutting off the energy source even during the operation of the valve apparatus.

According to the present invention, there is also provided an apparatus for diagnosing abnormality and estimating degradation in a valve apparatus, comprising a data conversion unit including a driving force sensor for detecting driving force of a driving portion, built in the is driving portion of a valve apparatus and connected to a diagnosing apparatus, an energy sensor for detecting feed energy to the driving portion and a vibration sensor for detecting vibration of the valve apparatus that are provisionally fitted to the valve apparatus, the data conversion unit being used for converting detection signals outputted from these three kinds of sensors to predetermined signals; and a processor connected to the data conversion unit, for collecting data, preserving accumulation of maintenance records including an allowance value of each diagnostic item calculated from the specification of the valve apparatus and set in advance and the diagnostic result, conducting an analytical diagnosing processing for each diagnostic item to judge whether the valve apparatus is normal or abnormal, conducting further degradation estimation while conducting calculation with past diagnostic results, and preparing a future maintenance plan, thereby making it possible to conduct diagnosis from outside without opening and disassembling the valve apparatus and without cutting off the energy source even during operation of the valve apparatus.

The present invention uses a small light-weight portable abnormality diagnosing/degradation estimating apparatus comprising a data exchange unit and a processor, a driving force sensor built in permanently, such as a torque sensor, and a provisional energy sensor for detecting a current such as a leakage current and a provisional vibration sensor for detecting vibration which provisional sensors can be fitted by one-touch operation, does not need to open a cover, etc, can conduct diagnosis within a short time without changing at all the valve apparatus not only during the stop of a plant operation but also during its operation, and can moreover manage a plurality of valve apparatuses.

Further, necessary data can be mutually exchanged among one processor having a database function and a plurality of processors each having a diagnosing function by respectively providing separate processors with the diagnosing function and with the database function (for managing data, valve specification, allowance value of each diagnostic item, diagnostic data, etc).

Moreover, it is possible to estimate degradation of each sliding portion and other movable portions and eventually to estimate their limit of use or exchange timing.

DESCRIPTION OF THE PREFERRED EMBODIMENTS

Hereinafter, an embodiment of the present invention applied to an electric valve (inclusive of a solenoid valve) will be explained concretely with reference to the accompanying drawings. Incidentally, the present invention can likewise be applied to valve apparatuses of a fluid pressure system and other systems.

Figure 1:
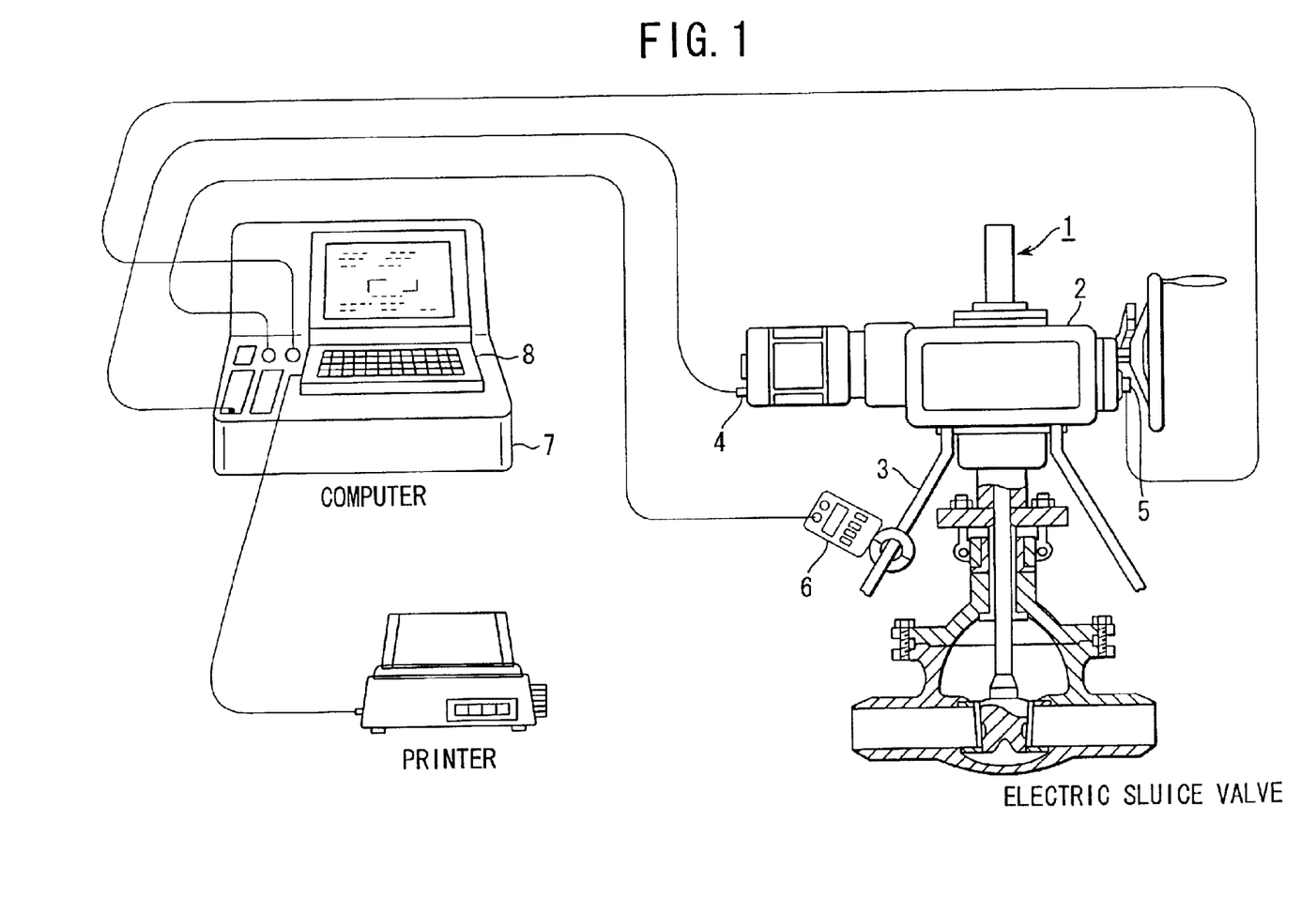
FIG. 1 schematically shows an apparatus according to one embodiment of the present invention.

Referring initially to FIG. 1, reference numeral 1 denotes an electric valve to be detected. Reference numeral 2 denotes an electric driving device for opening and closing the valve. Reference numeral 3 denotes a power cable for supplying a voltage and a current to a motor, not shown, in the electric driving device 2.

The electric driving device 2 in the electric valve 1 includes a built-in torque sensor 4 permanently provided, and a vibration sensor that is provisionally fitted. A current sensor 6 for detecting a feed current or a leakage current is provisionally fitted to the power cable 3.

In some cases, a magnetic sensor is fitted to the electric driving device 2 in place of the current sensor 6 fitted to the power cable 3.

Each of the sensors 4, 5 and 6 described above is connected to a data conversion unit 7. The data conversion unit 7 converts an output signal of each sensor 4 to 6 and transfers the output signal as diagnostic data to a processor 8.

The processor 8 has the function of converting the reception data from analog data to digital data and instantaneously executing an analytical processing of the diagnostic data information to display the result of analysis on a measurement site, and the function of storing the result of diagnosis and the diagnostic data in memory means and specifying abnormal positions of the driving portion and the valve and judging as a whole the replacement timing of the abnormal components on the basis of the diagnostic data, past diagnostic data and a periodical inspection plan.

Figure 2:
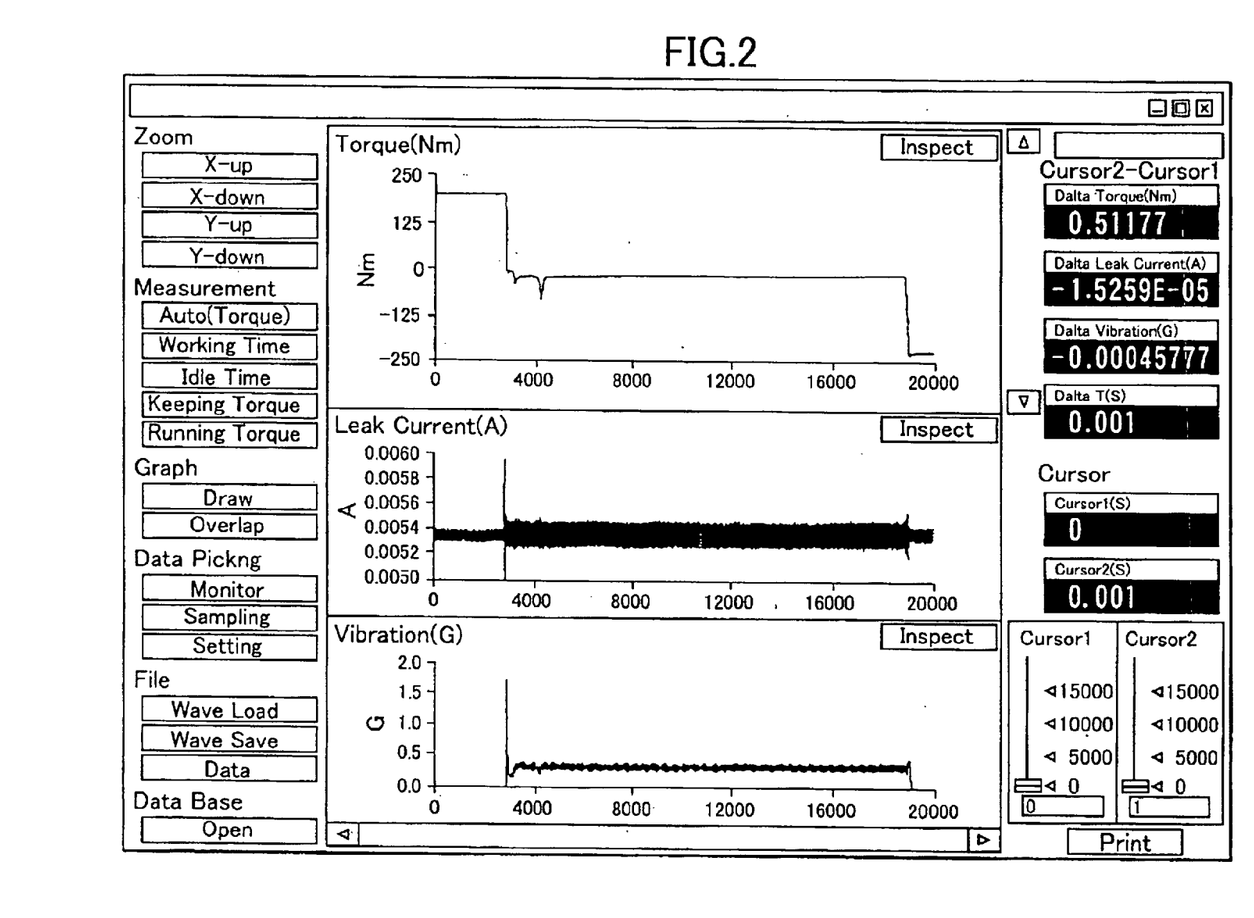
FIG. 2 shows an example of information obtained by the apparatus of the present invention.
Figure 3:
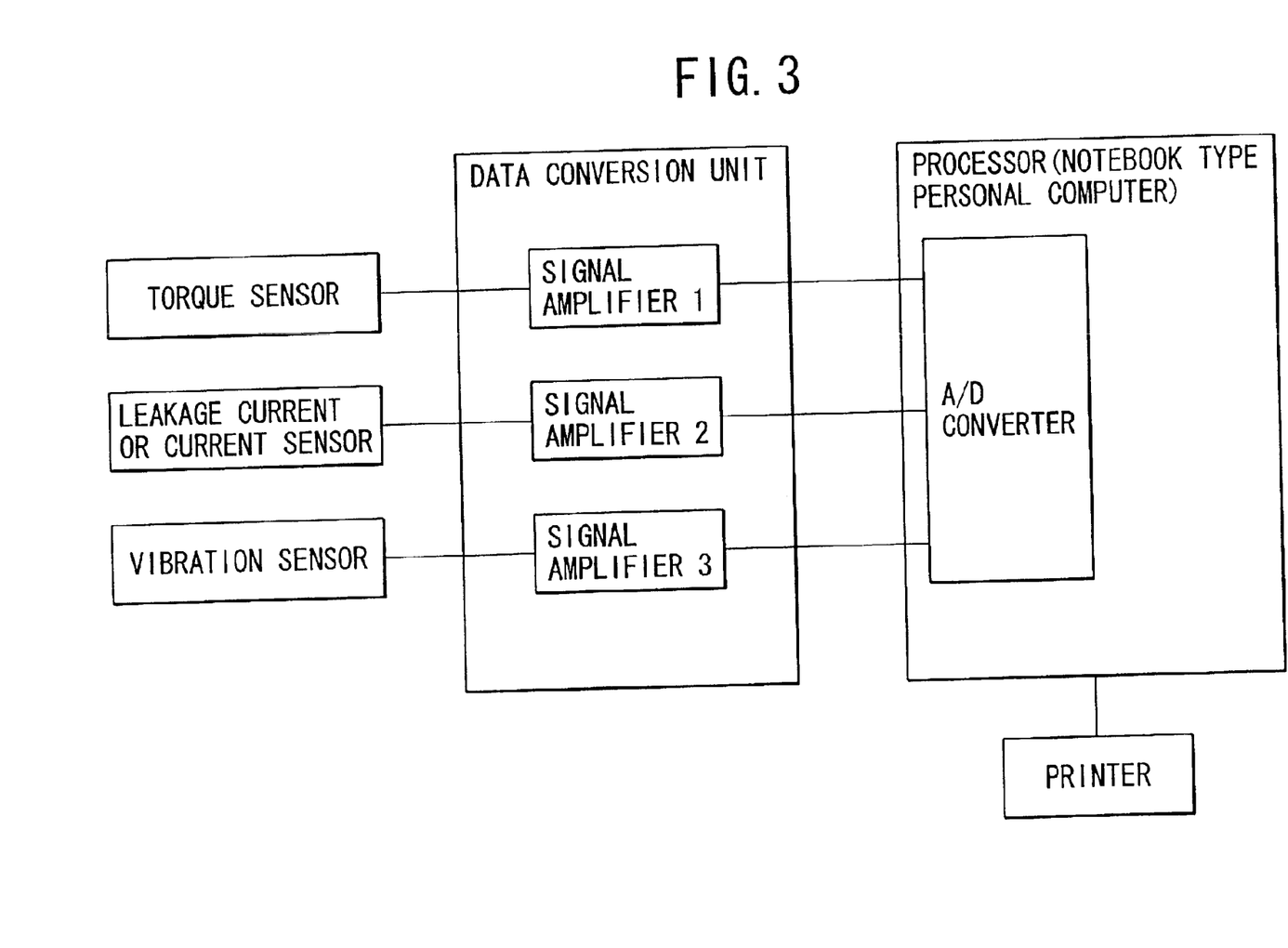
FIG. 3 shows an example of a block construction of the apparatus of the present invention.
Figure 4:
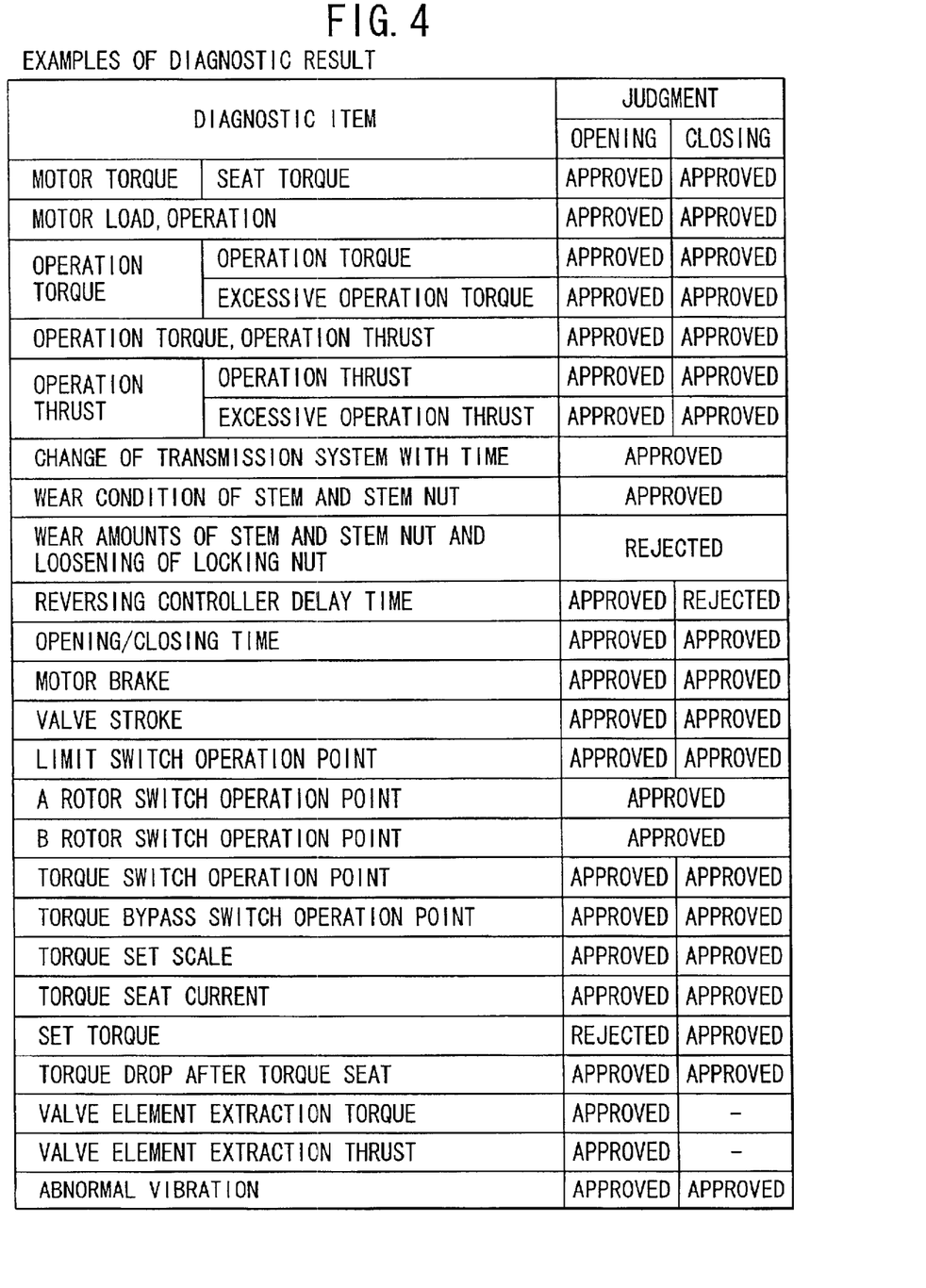
FIG. 4 shows an example of a screen representing normal or abnormal judgment result.
Figure 5:
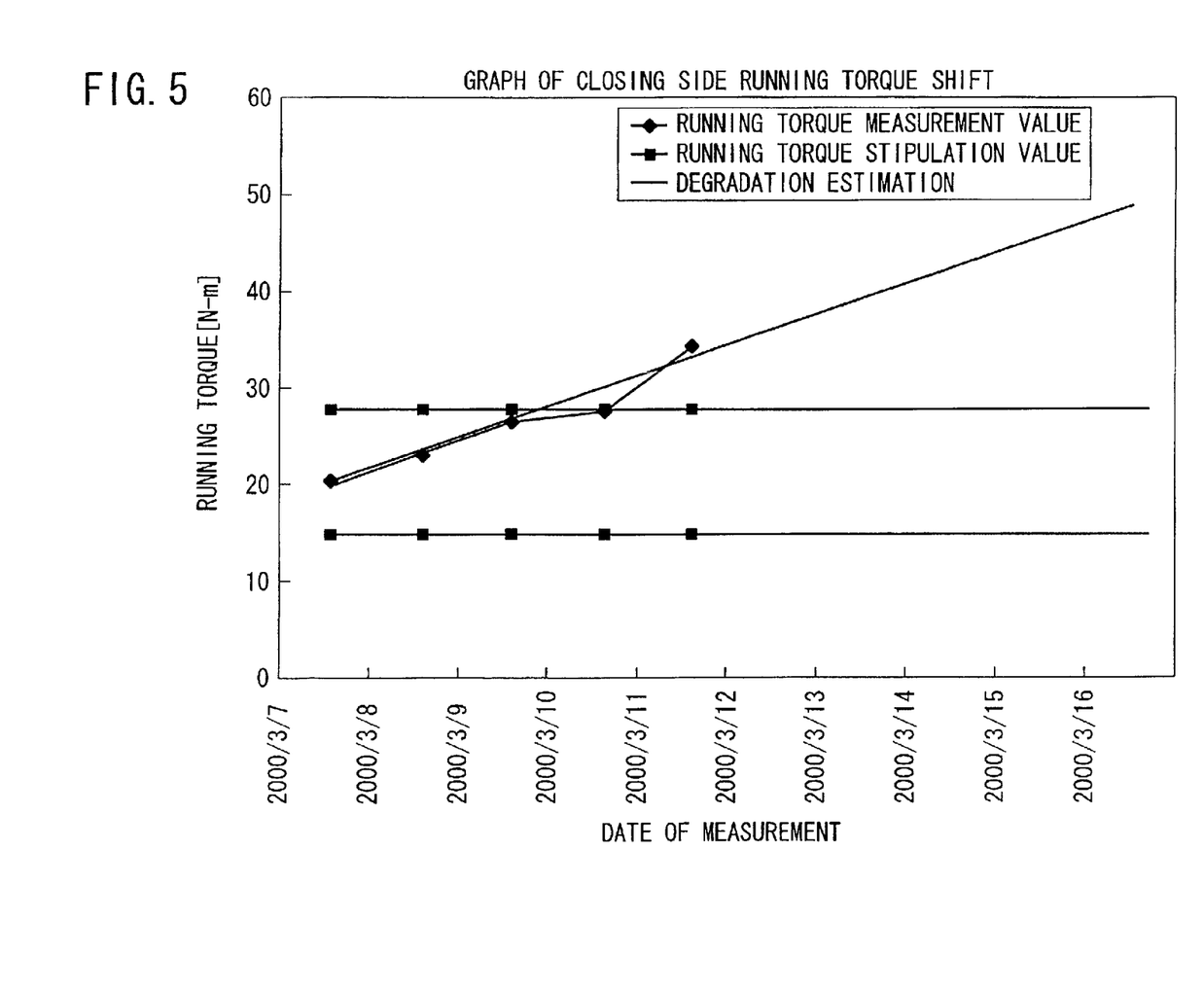
FIG. 5 shows an example of degradation estimation.
Figure 6:
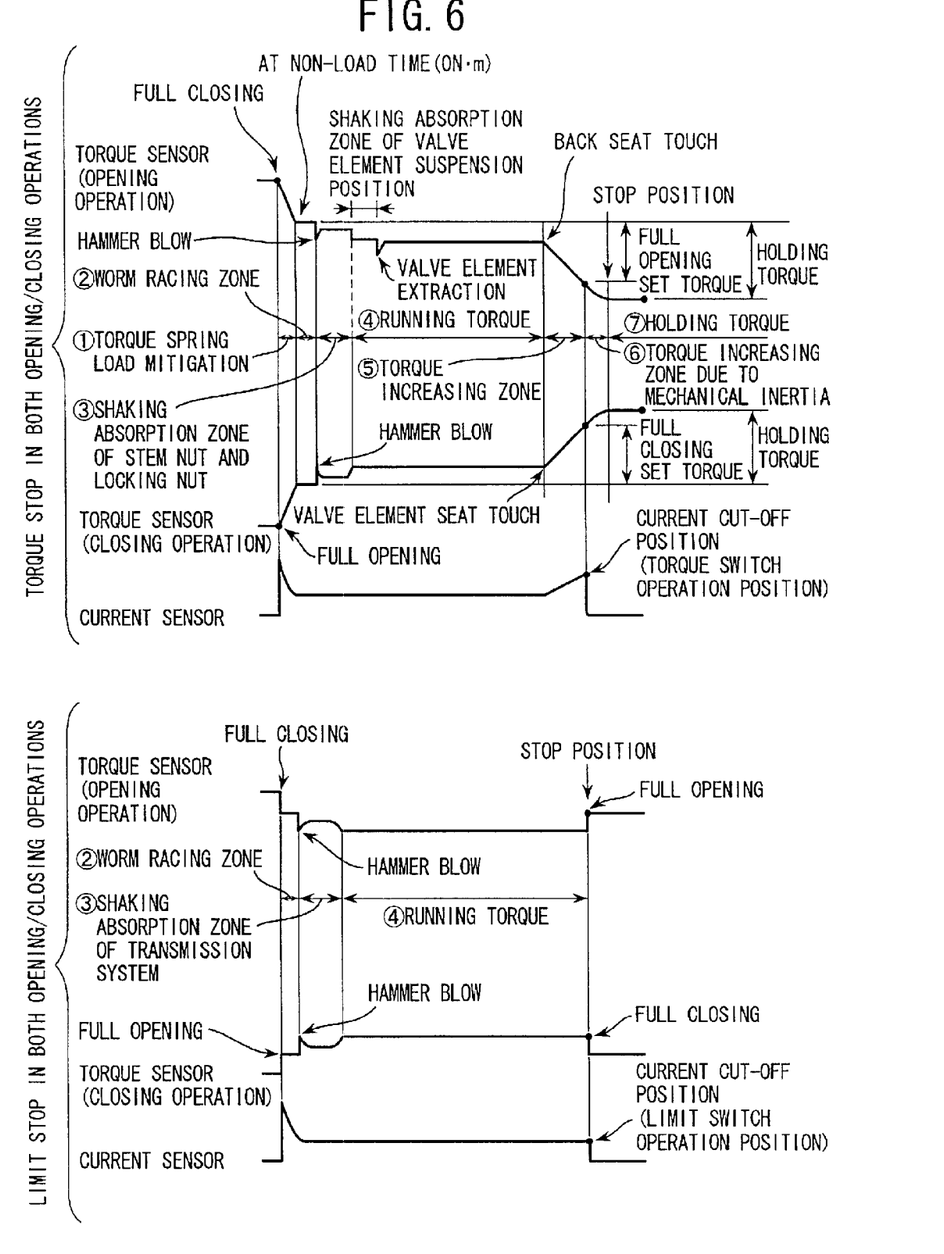
FIG. 6 shows a relation between waveforms and diagnostic elements.

FIG. 2 shows an example of the information acquired by the apparatus of the present invention. FIG. 3 shows an example of a block construction of the apparatus of the present invention. FIG. 4 shows an example of a screen representing the normal or abnormal judgment result. FIG. 5 shows an example of degradation estimation and FIG. 6 shows a relation between waveforms and diagnostic elements.

Next, explanation will be given how the sensors 4 to 6 described above diagnose abnormality of the function of the electric valve 1 and the function of the electric driving device 2.

The operating condition of the electric valve 1 can be easily determined by judging the torque of the electric driving portion, and can be grasped mainly when the processor compares the data collected with the operation characteristics of the electric valve 1. In other words, since the data of the torque during the normal operation of the electric valve 1 changes in synchronism with the data of the operational force of the valve, the operating condition can be estimated in the following way and can be used as indice of diagnosis.

(1) full open→recording of full open operation (sluice valve, torque seat)

Before start (holding torque acts on closing side)→start of motor (torque in closing direction is mitigated)→hammer blow→absorption of shaking of transmission system after drive sleeve (with almost zero torque)→absorption of shaking between valve rod and valve element (torque somewhat increases)→extraction of valve element (torque temporarily increases)→valve intermediate operation (torque decreases and gets substantially stabilized)→torque stops upon full opening of valve (torque becomes great).

If an appropriate holding torque necessary for cutting off a fluid is kept before the start, the electric valve is normal. Unless the time increases before absorption of hammer blow is finished, it can be judged that wear and loosening do not occur in the transmission system.

Unless the torque during the valve intermediate operation (running torque) increases or decreases with respect to the torque during the normal operation, it can be judged that the sliding portions do not have any abnormality.

Further, unless the torque when power to the motor is cut off (set torque) and the torque after the stop (holding torque) increase or decrease with respect to the torque during the normal operation, it can be judged that the electric valve is not deteriorated and the sliding portions do not have any abnormality.

(2) full open→recording of full closing operation (sluice valve torque seat)

Before start (holding torque acts on opening side)→start of motor (torque in opening direction is mitigated)→ hammer blow→shaking of transmission system after drive sleeve (with torque almost zero)→valve intermediate operation (torque somewhat increases and is substantially stabilized)→torque stop due to valve full closing (torque increases).

If an appropriate holding torque is kept before the start, the electric valve is normal. Unless the time increases before absorption of hammer blow is finished, it can be judged that wear and loosening do not occur in the transmission system.

Unless the torque during the valve intermediate operation (running torque) increases or decreases with respect to the torque during the normal operation, it can be judged that the sliding portions do not have any abnormality.

Further, unless the torque when power to the motor is cut off (set torque) and the torque after the stop (holding torque) increase or decrease with respect to the torque during the normal operation, it can be judged that the sliding portions do not have any abnormality.

Hereinafter, diagnostic items, diagnostic elements and an evaluation method will be explained. Incidentally, FIG. 6 shows the relation between diagnostic elements and torque waveforms.

TABLE 1

| diagnosable items | detection elements |
|---|---|
| seat force | holding torque |
| sliding drag | running torque |
| inferior adjustment and fault of torque switch | holding torque |
| degree of torque margin at driving portion at actual load | holding torque, running torque |
| abnormality of transmission system | running torque and torque signal waveform |
| valve fixation phenomenon | running torque and torque signal waveform |
| bending of valve rod | running torque and torque signal waveform |
| breakage of valve rod | running torque and torque signal waveform |
| opening/closing time change of position seat valve (deviation of limit switch) | operation time |
| wear amount of stem nut | shaking absorption time |
| loosening amount of locking nut | shaking absorption time |
| shaking amount of valve element suspension portion | shaking absorption time |
| actuation bypass | torque signal waveform at start |
| full zone bypass | set torque, holding torque |

(1) Seat force
1) Detection element: holding torque
2) Measurement method:

In both opening and closing operations, the value when the behavior of the electric valve due to inertia, etc, gets settled and the torque gets stabilized is measured after the motor stops due to the stop of the torque (the torque sensor signal collected becomes final data in the case of automatic measurement).
3) Judgment:

Though no standard is available for the holding torque, judgment is made in the following way because it is known through experiments that when the set torque changes at a certain proportion, the holding torque similarly changes at a substantially equal proportion.

[1] In the case of automatic fastening of worm and worm wheel:

Upper and lower limit values are determined in advance on the basis of basic data collected when the electric valve is under the sound condition. The measurement value is judged as abnormal when it exceeds any of these limit values.

[2] In the case of non-automatic fastening of worm and worm wheel (with motor brake):
Upper limit value:

When the upper limit value exceeds a predetermined level from the value determined from the basic data collected when the electric valve is under the sound condition, the valve is judged as abnormal.

Lower limit value:

The electric valve is judged as abnormal when the lower limit value is lower than the value calculated by motor braking torque×ratio×efficiency.

(2) Sliding drag
1) Detection elements: running torque
2) Measurement method:

In both opening and closing operations, the value when the behavior of the electric valve gets settled and the torque gets stabilized during the valve intermediate operation is measured.
3) Judgment:

Since no standard is available for the sliding drag, the value set by a user is used as the judgment standard, but the following judgment is used unless specified otherwise.

[1] In the case of non-load operation:

Upper and lower limit values are determined in advance on the basis of the basic data collected when the electric valve is under the sound condition, and when the measurement value exceeds any of them, the electric valve is judged as abnormal.

[2] In the case of actual load operation:

Upper and lower limit values are determined in advance on the basis of the first time actual reduction data value after collection of the basic data collected when the electric valve is under the sound condition, and when the measurement value exceeds any of them, the value is judged as abnormal.

However, the value should be within the range where no fluid leak occurs from the ground packing when the full closing/opening operations are conducted. Precision diagnosis is conducted when a drastic change occurs in a trend management graph even when the value remains within the normal range from the judgment standard in both non-load operation and the actual load operation.

(3) Inferior adjustment and fault of torque switch
1) Detection element: set torque However, the holding torque is used when the set torque is not definite.
2) Measurement method:

[1] Measurement method of set torque:

The torque value at the time of cut-off of the motor current that can be judged from the leakage current of the motor or from the motor current is measured.

[2] Measurement method of holding torque:

In both opening and closing operations, the value when the behavior of the electric valve due to inertia, etc, gets settled and the torque gets stabilized is measured after the motor stops due to the stop of the torque.
3) Judgment:

[1] Set torque:

The set torque is stipulated to be within ±10% of the design value by the standard (JEM1446). Therefore, when the set torque deviates from ±10% of the value specified in the specification, the electric valve is judged as abnormal.

[2] Holding torque:

Though no standard is available for the holding torque, judgment is made in the following way because it is known through experiments that when the set torque changes at a certain proportion, the holding torque similarly changes at a substantially equal proportion.

a) In the case of automatic fastening of worm and worm wheel:

Upper and lower limit values are determined in advance on the basis of basic data collected when the electric valve is under the sound condition. The electric valve is judged as abnormal when the measurement value exceeds any of these limit values.

b) In the case of non-automatic fastening of worm and worm wheel (with motor brake):
Upper limit value:

When the upper limit value exceeds a predetermined level of the value determined from the basic data collected when the electric valve is under the sound condition, the electric valve is judged as abnormal.

Lower limit value:

The electric valve is judged as abnormal when the lower limit value is lower than the value calculated by motor braking torque×ratio×efficiency.

(4) Torque margin of driving portion at actual load:
1) Detection element:
   Ratio of set torque to running torque
2) Measurement method:
   Holding torque÷running torque
   [1] Measurement method of holding torque:
      In both opening and closing operations, the value when the behavior of the electric valve due to inertia, etc, gets settled and the torque gets stabilized is measured after the motor stops due to the stop of the torque.
   [2] Measurement method of running torque:
      In both opening and closing, operations, the value when the behavior of the electric valve gets settled and the torque gets stabilized in the valve intermediate operation condition is measured.
3) Judgment:
   Since a concrete reference such as a standard does not exist, the electric valve is judged as abnormal when the ratio of the holding torque to the running torque measured is lower than a reference value determined individually in accordance with the valve specification or with the use condition.

(5) Abnormality of transmission system:
1) Detection element:
   Running torque and torque signal waveform
2) Measurement method:
   Observation of waveform with eye
3) Judgment:
   Abnormality of the transmission system appears as cyclic distortion in the running torque waveform of the torque sensor signal collected. Therefore, the operator judges abnormality from the waveform, and when any cyclic distortion exists, the fault position is specified from the cycle.

(6) Valve fixation phenomenon:
1) Detection element:
   Running torque and torque signal waveform
2) Measurement method:
   In both opening and closing operations, the value when the behavior of the electric valve gets settled and the torque gets stabilized in the valve intermediate operation condition is measured.
3) Judgment:
   When the valve undergoes fixation, the torque exceeding the set torque occurs as soon as the rotational force of the motor is transmitted to the valve rod, and the torque switch operates to stop the torque. Therefore, the judgment result of the sliding drag proves abnormal and at the same time, the collected waveform becomes remarkably different from the waveforms collected in the past and is also different from the waveforms of other troubles. Therefore, the operator can judge valve fixation from the torque waveform.

(7) Bending of valve rod:
1) Detection element:
   Running torque and torque signal waveform
2) Measurement method:
   In both opening and closing operations, the value when the behavior of the electric valve gets settled and the torque gets stabilized in the valve intermediate operation condition is measured.
3) Judgment:
   When bending occurs in the valve rod, the sliding drag of the electric valve increases as the bent portion of the valve rod becomes closer to an interference portion such as a ground packing. In this case, the judgment result of the sliding drag proves abnormal and the collected waveform becomes remarkably different from the waveforms collected in the past. In addition, the running torque gradually rises and when the bent portion passes by the interference portion, the running torque drops gradually. On the basis of this characterizing phenomenon, the operator can judge bending from the torque waveform.

(8) Breakage of valve rod:
1) Detection element:
   Running torque and torque signal waveform
2) Measurement method:
   In both opening and closing operations, the value when the behavior of the electric valve gets settled and the torque gets stabilized in the valve intermediate operation condition is measured, and the torque signal waveform is observed.
3) Judgment:
   In the case of breakage of the valve rod, the valve rod undergoes racing when the rotational force of the motor is transmitted, and the sliding drag becomes low. Therefore, the judgment result of the sliding drag proves abnormal, and since the collected waveform becomes remarkably different from the waveforms collected in the past, the operator can judge breakage from the torque waveform.

(9) Opening/closing time of position seat value and valve stroke change
1) Detection element: operation time
2) Measurement method:
   The time from the hammer blow to the valve stop is measured from the torque data waveform.
3) Judgment:
   The standard (JEM1446) permits a 15% margin for the opening/closing time. Therefore, the electric valve is judged as abnormal when the measurement data is deviated by +10 to −5% from the basic data (data when the electric valve is normal).

(10) Amount of shaking resulting from wear of stem nut:
1) Detection element: absorption time of shaking
2) Measurement method:
   The time from the hammer blow in the closing operation to the occurrence of the running torque is measured, and this measurement time is multiplied by the moving speed of the valve rod that is measured in advance as the basic data when the electric valve is normal. In this way, the amount of shaking occurring at the locking nut portion and in the stem nut can be determined.
3) Judgment:
   The wear amount of the stem nut is stipulated to be within 30% of the width of the screw thread of the stem nut. The electric valve is judged as abnormal when the wear amount exceeds this value.
   Loosening of the locking nut drastically proceeds whereas the wear of the stem nut proceeds gradually in the course of long time. Therefore, when the data is built up and the tendency management is conducted, they can be distinguished from each other.

(11) Amount of shaking resulting from loosening of locking nut:
1) Detection element: absorption time of shaking
2) Measurement method:
   The time from the hammer blow in the closing operation to the occurrence of the running torque is measured, and this measurement time is multiplied by the moving speed of the valve rod that is measured in advance as the basic data when the electric valve is sound. In this way, the amounts of shaking occurring at the stem nut and the locking nut portion can be determined.

3) Judgment:

Since the detection element and the detection method of the loosening amount of the locking nut are exactly the same as those of the stem nut wear, the reference value is the same as that of the stem nut wear. When shaking exceeding 30% of the width of the screw thread of the stem nut screw is detected, the electric valve is judged as abnormal. Loosening of the locking nut drastically proceeds whereas the wear of the stem nut proceeds gradually in the course of long time. Therefore, when the data is built up and the tendency management is conducted, they can be distinguished from each other.

(12) Amount of shaking of bond portion of valve rod and valve element in sluice valve:

1) Detection element: absorption time of shaking
2) Measurement method:

The time from completion of absorption of shaking resulting from loosening of the locking nut and from the wear of the stem nut when the valve in fully closed state is opened due to the stop of the torque to the valve extraction is measured. When this measurement time is multiplied by the moving speed of the valve rod that is measured in advance as the basic data is sound, the wear amount of the bond portion between the valve rod and the valve element can be detected.

3) Judgment:

Since a general standard is not available for the wear amount of the bond portion between the valve rod and the valve element in the sluice valve, abnormality is judged through comparison with a given value of a manufacturer inputted in advance to a database or with a user's known value.

(13) Operation position of instantaneous bypass limit switch:

1) Detection element:

Torque signal waveform at start

2) Judgment:

[1] In the case of torque seat sluice valve on closing side:

When a capacity beyond the set torque on the open side is required at the time of valve element extraction in the operation in the opening direction from the fully closed state, the valve element can be normally extracted and can operate normally if the operation position of the torque bypass limit switch is at a suitable position.

However, when the operation in the opening direction is conducted under the state where the operation position of the torque bypass limit switch is deviated towards the fully closing side, the operation is stopped by the capacity of the set torque on the open side before the valve extraction. Therefore, when this phenomenon is observed through the torque signal, the electric valve is judged as abnormal.

[2] In the case of torque seat glove valve on closing side:

When the capacity exceeding the set torque on the open side develops due to the hammer blow effect in the operation in the opening direction, the electric valve operates normally provided that the operation position of the torque bypass limit switch is a suitable position.

However, when the operation in the opening direction is conducted under the state where the operation position of the torque bypass limit switch is deviated to the fully closing side, the operation stops at the hammer blow position by the capacity of the set torque on the open side. Therefore, when this phenomenon is observed by the torque signal, the electric valve is judged as abnormal.

(14) Operation position of full-zone bypass limit switch:

1) Detection element:

If the operation position of a torque bypass limit switch is suitable, the torque bypass limit switch contact is turned OFF near the full open point in the opening operation and near the full close point in the closing operation, and the torque switch (set torque) thereafter stops the valve.

However, when the operation position of the torque bypass limit switch deviates from the torque switch operation position towards the full open side during the opening operation and towards the full closing side in the closing operation, the motor does not stop even when the torque switch operates so long as the torque bypass limit switch contact remains ON, and keeps operating until the bypass is released within the capacity that the motor can provide. As a result, the set torque apparently rises, and the holding torque rises, too.

Therefore, the detection element is either the set torque or the holding torque.

[1] Measurement method of set torque:

The torque value at the time of cut-off of the motor current that can be judged from the leakage current of the motor or from the motor current is measured.

[2] Measurement method of holding torque:

In both opening and closing operations, the value when the behavior of the electric valve due to the inertia, etc., gets settled and the torque gets stabilized after the motor stops due to the torque stop is measured.

3) Judgment:

[1] Set torque:

The set torque is stipulated to be within ±10% of the design value by the standard (JEM1446). Therefore, when the set torque deviates from ±10% of the value specified in the specification, the electric valve is judged as abnormal.

[2] Holding torque:

Though no standard is available for the holding torque, judgment is made in the following way because it is known through experiments that when the set torque changes at a certain proportion, the holding torque similarly changes at a substantially equal proportion.

a) In the case of automatic fastening of worm and worm wheel:

Upper and lower limit values are determined in advance on the basis of basic data collected when the electric valve is under the sound condition. The electric valve is judged as abnormal when the measurement value exceeds any of these limit values.

b) In the case of non-automatic fastening of worm and worm wheel (with motor brake):

Upper limit value:

When the upper limit value exceeds of a predetermined range of the value determined from the basic data collected when the electric valve is under the sound condition, the electric valve is judged as abnormal.

Lower limit value:

The electric valve is judged as abnormal when the lower limit value is lower than the value calculated by motor brake braking torque×ratio×efficiency.

When the electric valve is judged as abnormal by the diagnosis described above, necessary measure such as warning or generation of an alarm is taken.

Degradation estimation and reparation of maintenance plan:

When diagnostic data of a plurality of times are built up for a certain electric valve, the tendency of the change is extracted from the diagnostic data information for each diagnostic item, and the timing at which the reference for judging soundness of the electric valve is reached is determined.

Further, when a periodical inspection plan is set in a database, in the periodical inspection just before the timing at which degradation of the valve to be detected reaches the reference, the valve is listed as a valve subject to maintenance. Sequentially, content of maintenance is added to the database and represented.

The foregoing merely relate to embodiments of the invention. Various changes and modifications may be made by persons skilled in the art without departing from the scope of claims wherein:

What is claimed is:

1. A method for diagnosing abnormality and estimating degradation in a valve apparatus, comprising the steps of:

connecting a torque sensor provided to a driving portion of a valve apparatus to a diagnosing apparatus, provisionally fitting current sensor for detecting an electric current to said driving portion and a vibration sensor for detecting vibration of said valve apparatus to said valve apparatus;

converting detection signals outputted from said three kinds of sensors to predetermined signals in a data conversion unit;

conducting an analytical diagnosing processing of diagnostic data information for each diagnostic item by referring to an allowance value of each diagnostic item calculated from the specification of said valve apparatus and set in advance, and to a maintenance record inclusive of the diagnostic result to judge whether said valve apparatus is normal or abnormal, said diagnostic data information including at least data about aptitude evaluation of torque of the driving portion, data about aptitude evaluation of seat force of the driving portion, data about aptitude evaluation of sliding drag of the driving portion, data about aptitude evaluation of time between opening and closing of a valve, data about aptitude evaluation of wear and loosening of said valve apparatus, and data about aptitude evaluation of a limit stop position of the valve;

conducting further degradation estimation by conducting calculation with past diagnostic results, and preparing a future maintenance plan, thereby making it possible to conduct diagnosis from outside without opening and disassembling said valve apparatus and without cutting off the energy source even during operation of said valve apparatus.

2. A method according to claim 1, wherein said data are collected a plurality of times with time intervals for each of said data, and when the result of the diagnosis is recorded, degradation estimation is conducted on the basis of said result of diagnosis to generate said future maintenance plan.

3. An apparatus for diagnosing abnormality and estimating degradation in a valve apparatus, comprising:

a torque sensor mounted on a driving portion of the valve apparatus for detecting torque of the driving portion;

a current sensor for detecting an electric current to said driving portion;

a vibration sensor for detecting vibration of said valve apparatus, said current and vibration sensors being provisionally fitted to said valve apparatus;

a data conversion unit connected to said three sensors for convening detection signals outputted from said three kinds of sensors to predetermined signals; and a processor connected to said data conversion unit, for collecting data, preserving-accumulation of maintenance records including an allowance value of each diagnostic item calculated from the specification of said valve apparatus and set in advance, and the diagnostic result, conducting an analytical diagnosing processing of diagnostic data information for each diagnostic item to judge whether said valve apparatus is normal or abnormal, said diagnostic data information including at least data about aptitude evaluation of torque of the driving portion, data about aptitude evaluation of seat force of the driving portion, data about aptitude evaluation of sliding drag of the driving portion, data about aptitude evaluation of time between opening and closing of a valve, data about aptitude evaluation of wear and loosening of said valve apparatus, and data about aptitude evaluation of a limit stop position of the valve, conducting further degradation estimation while conducting calculation with past diagnostic results, and preparing a future maintenance plan, thereby making it possible to conduct diagnosis from outside without opening and disassembling said valve apparatus and without cutting off the energy source even during operation of said valve apparatus.

4. An apparatus according to claim 3, wherein said data are collected a plurality of times with time intervals for each of said data, and when the result of the diagnosis is recorded, degradation estimation is conducted on the basis of said result of diagnosis to generate said future maintenance plan.

* * * * *